United States Patent [19]

Whiting, Jr.

[11] 4,174,038
[45] Nov. 13, 1979

[54] PACKAGE FOR PHOTOGRAPHIC FILM AND MATERIAL AND POWDERS FOR MAKING SAME

[75] Inventor: Philip C. Whiting, Jr., Holyoke, Mass.

[73] Assignee: Ludlow Corporation, Needham Heights, Mass.

[21] Appl. No.: 774,934

[22] Filed: Mar. 7, 1977

[51] Int. Cl.² .............................................. B65D 85/00
[52] U.S. Cl. ................................... 206/389; 206/524.2
[58] Field of Search ...................... 206/524.2, 389, 455

[56] References Cited

U.S. PATENT DOCUMENTS 3,458,033  7/1969  Ariyasu et al. ........................ 206/455
4,070,398  1/1978  Lu ....................................... 206/524.5

FOREIGN PATENT DOCUMENTS 1233936  6/1971  United Kingdom ..................... 206/389

Primary Examiner—Robert I. Smith
Attorney, Agent, or Firm—Robert A. Cesari; John F. McKenna; Andrew F. Kehoe

[57] ABSTRACT

A thinner, less-expensive-to produce, and more easily handled, opaque sheet is formed by coextrusion of two polymeric layers containing relatively low loadings of black pigment around a third layer of polymer which is pigmented at levels higher than would be practical using conventional extrusion processes, rather than a coextrusion procedure. The sheet is an improved product for use in packaging photographic film or like products to be protected from light.

14 Claims, 4 Drawing Figures

PACKAGE FOR PHOTOGRAPHIC FILM AND MATERIAL AND POWDERS FOR MAKING SAME

BACKGROUND OF THE INVENTION

It has long been the practice to package light-sensitive photographic film in opaque packages, usually black packages formed of layers of black-pigmented paper and/or plastic layers. One package, typical of the best being used, is formed of a packaging sheet constructed of the following layers:

(1) black paper—obtained from paper manufacturers
(2) a coating of about 0.001 inch of polyethylene containing 10% of carbon black pigment
(3) another coating like coating (2) coated over coating (2).

The sheet described above comprises 2 mils of polyethylene, in addition to the thickness of the black paper, and is wholly acceptable in meeting the required degree of opacity for film packaging which can be generally described as that degree of opacity which will protect a 1000 ASA-speed film from a 5000 watt lamp placed close to the package. Nevertheless, this pigmented polyethylene sheet of the art is relatively expensive and less flexible than is desirable. Applicant set out to provide an improved package, one that is more easily handled and which requires less carbon black filler.

SUMMARY OF THE INVENTION

It is an object of the invention to provide a process whereby an improved, more easily manipulated, and less expensive opaque packaging paper may be produced.

Another object of the invention is to provide an improved opaque sheet, one which is more flexible, more dependably opaque, and less expensive to make.

Still another object of the invention is to provide a novel opaque package.

Another object of the invention will be obvious to those skilled in the art on reading the present disclosure.

The above objects have been substantially achieved by utilizing a process whereby a very high loading of carbon black in a centrally-located polymeric matrix is carried through the die of an extruder while sandwiched between two outer layers of polymer. The outer layers have from 0 to 8% carbon black therein and protect the central layer from contact with the hot extrusion die. Consequently, severe rheological and sticking problems associated with contact of such dies with a highly-loaded polymer, e.g. one containing 20 to 25% by weight of carbon black are wholly avoided. A smooth extrudate is achieved with minimal build up of material on the die surfaces. The practical consequence of this procedure allows the loading of the polymer layer so that it comprises an advantageously-high loading of carbon black, thereby reducing the total amount of carbon black that must be used in the system. The amount of polymer that must be used is also reduced and allows a marked reduction in the gauge of the overall packaging sheet which must be used to achieve the desired opacity. In sum, these modifications allow a suitably opaque product to be produced which is less expensive and more flexible while simultaneously providing a better-protected and improved opaque barrier within the product.

The outer layers of polymer are advantageously polyethylene containing 0 to 10% carbon black. Loadings of 5 to 8% are preferred as a balance between optimum extrudability and an achieving a supplemental opacity characteristic for the central opaque barrier layer. These outer layers are about 0.0005 inches thick. The central layer contains 15 to 25% carbon black and is also about 0.0005 inches thick. It should be understood that the term "layer" is used to facilitate description of the invention. The coextruded polymer is really a single layer best construed as three distinguishable zones of polymer melt-bonded to form a single extruded web. The coextruded ply is up to about 2 mils in thickness.

In the prior art, the black paper used in manufacture of opaque packaging materials has usually been a paper of a weight of 70–80 lbs per ream. In the present invention, with the protective value of a thick outer paper minimized by the concentration of carbon black in an interior coating, it is possible to drop the paper to a thinner material, e.g. to a paper in the 15 lbs-to 40 lbs range. Indeed, it is possible to dispense entirely with carbon black in the paper layer. It also is possible to use the product of the invention to replace even foil-bearing laminates of the prior art in those applications wherein visible light is the radiation to be absorbed by the packaging material.

Although the invention is described with respect to polyethylene, and the advantages over the prior art processes and products are particularly emphatic with respect to products utilizing low density and medium density polyethylene polymer, it is to be further emphasized that the process of the invention will allow substitution of a different polymer composition, i.e. a more abrasion resistant polymer in either one or both of the lower-pigmented exterior zones of the sheet of the invention. Moreover, metallic and other selected inorganic fillers can be included in the interior zones of polymer and, when used, they can be selected to achieve an even wider range of opacity, e.g. aluminum can be used to absorb infra-red radiation.

The carbon black pigment is suitably an oil furnace carbon block having a nominal sub-micron particle size and surface area of from 25–150 square meters per gram.

ILLUSTRATIVE EXAMPLES OF THE INVENTION

In this application and accompanying drawings, there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

Figure 2:
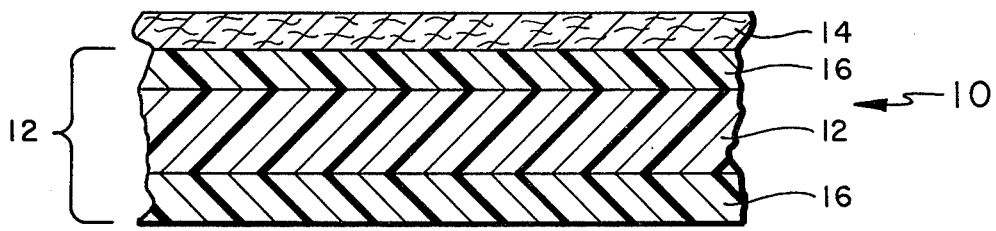
FIGS. 2 through 4 are schematic sectional views of packaging materials constructed according to the invention.

Referring to FIG. 2, it is seen that a packaging sheet material 10 is formed a polymeric web 12 which has been coextruded and laminated to a white paper 14 weighing about 17 lbs per ream and formed of a pulp commonly known to those skilled in the paper art as Bleached MO pulp. Web 12 comprises two outer zones 16 comprising medium density polyethylene loaded with about 7% carbon black. Inner zone 17 comprises a loading of 20% carbon black. Each zone is ideally about 0.0005 inches thick and, in any event, web 12 is about 0.0015 inches thick.

The coextrusion and lamination are carried out using manipulative procedures well known in the art.

Figure 4:
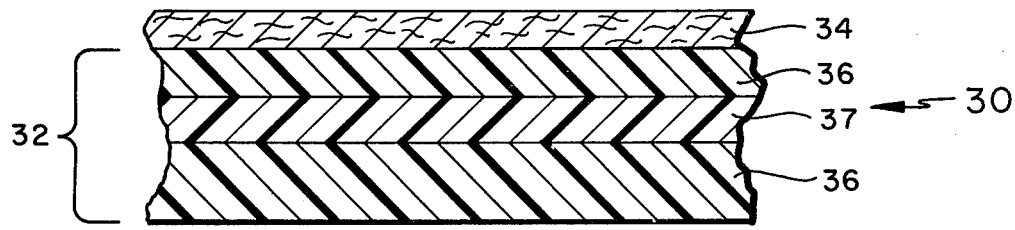

FIG. 4 illustrates a sheet material 30, comprising a carbon black pigmented paper 34, and a coextruded layer 32 which is laminated to the paper and comprises polyethylene zone 36 containing 5% carbon black and a zone 37 comprising 19% carbon black.

Figure 3:
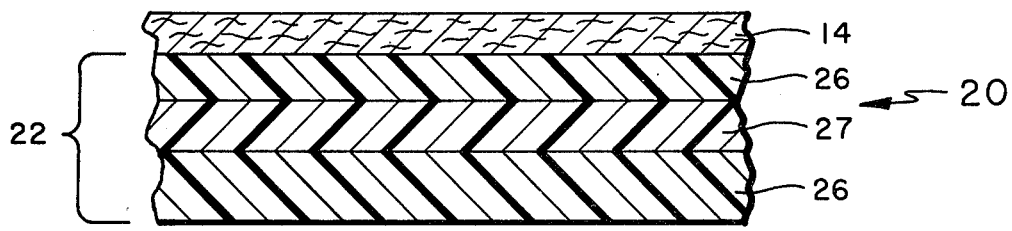
Figure 1:
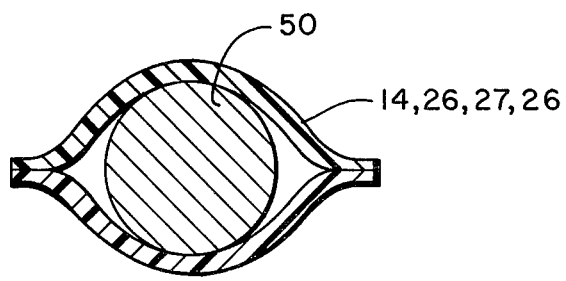
FIG. 1 is a section of an opaque package formed according to the invention.

FIG. 1 illustrates a package for photographic film formed of the packaging material, production of which is described in FIG. 2. The package is readily tearable because of the relative thinness of the packaging material and, also, because of the relative brittleness of the heavily-loaded central layer of the extruded melt. Thus, film roll 50 is securely packaged within the heat sealed material formed of the packaging sheet of FIG. 3.

It is also to be understood that the following claims are intended to cover all of the generic and specific features of the invention herein described and all statements of the scope of the invention which might be said to fall therebetween.

What is claimed is:

1. A heat-sealable, readily-tearable, opaque flexible packaging sheet material comprising a carbon containing polymeric ply on a paper substrate, the improvement wherein said carbon-containing polymeric ply is a co-extruded ply of polymer consisting of the following three co-extruded layers
   (a) an outer layer of about 0.0005 inch thickness comprising 0 to 10 percent carbon black
   (b) an interior layer having a thickness of about 0.5 mils comprising from about 15 to 25 percent carbon black
   (c) adjacent said paper, another outer layer of about 0.0005 inch thickness comprising 0 to 10 percent carbon black
and wherein said co-extruded ply has a maximum thickness of about 2 mils in thickness.

2. A packaging material defined in claim 1 wherein said outer layer comprises up to about 7.5% carbon black and wherein said polymer is polyethylene.

3. A sheet ply as defined in claim 2 wherein said co-extruded material is no greater than 0.0015 inches in thickness.

4. A material as defined in claim 3 wherein said interior layer comprises from about 20 to about 25% of carbon black.

5. A material as defined in claim 2 wherein said interior layer comprises from about 20 to about 25% of carbon black.

6. A packaging material as defined in claim 1 wherein substantially all opacity is attributable to carbon black contained in said interior layer.

7. A material as defined in claim 6 wherein said interior layer comprises from about 20 to about 25% of carbon black.

8. A package as defined in claim 1 wherein each said outer layer comprises up to about 7.5% carbon black.

9. A sheet ply as defined in claim 1 wherein said coextruded material is no greater than 0.0015 inches in thickness.

10. A material as defined in claim 9 wherein said interior layer comprises from about 20 to about 25% of carbon black.

11. A material as defined in claim 1 wherein said interior layer comprises from about 20 to about 25% of carbon black.

12. An opaque package for light-sensitive articles wherein an opaque barrier surrounds said article, said barrier being formed of a heat-sealable, readily-tearable, flexible opaque packaging sheet material comprising a carbon containing polymeric ply on a paper substrate, the improvement wherein said carbon-containing polymeric ply is a co-extruded ply of polyethylene consisting of the following three co-extruded layers
   (a) an outer layer of about 0.005 inch thickness comprising 0 to 10 percent carbon black
   (b) an interior layer having a thickness of about 0.5 mils comprising from about 15 to 25 percent carbon black
   (c) adjacent said paper, another outer layer of about 0.0005 inch thickness comprising 0 to 10 percent carbon black
and wherein said co-extruded ply has a maximum thickness of about 2 mils in thickness.

13. A package as defined in claim 12 wherein said article is photographic film.

14. A package as defined in claim 12 wherein substantially all opacity is attributable to carbon black contained in said interior layer.

UNITED STATES PATENT AND TRADEMARK OFFICE
CERTIFICATE OF CORRECTION

PATENT NO. : 4,174,038
DATED : November 13, 1979
INVENTOR(S) : Philip C. Whiting It is certified that error appears in the above-identified patent and that said Letters Patent are hereby corrected as shown below:

Column 2, line 41: change "block" to --black--;

Column 4, line 35: change "0.005" to --0.0005--;

Signed and Sealed this

Twenty-fifth Day of March 1980

[SEAL]

Attest:

SIDNEY A. DIAMOND

Attesting Officer

Commissioner of Patents and Trademarks